United States Patent
Dyakin et al.

(10) Patent No.: US 9,201,712 B2
(45) Date of Patent: Dec. 1, 2015

(54) SYSTEM AND METHOD FOR SELECTING A SYNCHRONOUS OR ASYNCHRONOUS INTERPROCESS COMMUNICATION MECHANISM

(71) Applicant: Kaspersky Lab ZAO, Moscow (RU)

(72) Inventors: Pavel V. Dyakin, Moscow (RU); Andrey Y. Gruzdev, Moscow (RU)

(73) Assignee: Kaspersky Lab AO, Moscow (RU)

( * ) Notice: Subject to any disclaimer, the term of this patent is extended or adjusted under 35 U.S.C. 154(b) by 0 days.

(21) Appl. No.: 14/220,590

(22) Filed: Mar. 20, 2014

(65) Prior Publication Data

US 2015/0186192 A1  Jul. 2, 2015

(30) Foreign Application Priority Data

Dec. 27, 2013  (RU) ................................ 2013158133

(51) Int. Cl.
 *G06F 9/54* (2006.01)
(52) U.S. Cl.
 CPC ........................ *G06F 9/54* (2013.01)
(58) Field of Classification Search
 CPC ................................. G06F 9/54; G06F 9/546
 See application file for complete search history.

(56) References Cited

U.S. PATENT DOCUMENTS

| | | | |
|---|---|---|---|
| 5,434,975 A | 7/1995 | Allen | |
| 6,938,251 B1 | 8/2005 | Chow et al. | |
| 7,013,465 B1 * | 3/2006 | Taylor et al. | 719/313 |
| 8,336,056 B1 | 12/2012 | Gadir | |
| 2007/0136533 A1 | 6/2007 | Church et al. | |
| 2008/0168130 A1 * | 7/2008 | Chen et al. | 709/203 |
| 2011/0213829 A1 * | 9/2011 | Concini et al. | 709/203 |
| 2013/0152096 A1 | 6/2013 | Park et al. | |

FOREIGN PATENT DOCUMENTS

| | | |
|---|---|---|
| EP | 0695993 A2 | 2/1996 |
| RU | 2358413 C1 | 6/2009 |
| WO | 2006120483 A1 | 11/2006 |

* cited by examiner

*Primary Examiner* — Syed Roni
(74) *Attorney, Agent, or Firm* — Arent Fox LLP; Michael Fainberg

(57) ABSTRACT

Disclosed are systems, methods and computer program products for selecting interprocess communication mechanism. In one aspect, the system collects information about resources used by two or more processes involved in an interprocess communication in which a first process can transfer data to a second process using one of a synchronous and asynchronous data transfer methods; analyzes the collected information to determine which data transfer method achieves at least one of minimizing time of the data transfer between processes, maximizing utilization of resources used for the data transfer, minimizing standstill time during the data transfer, minimizing effect of other processes of the operating system on the data transfer; and based on the determination, selects one of the synchronous or asynchronous method of interprocess communication to transfer the data between the first and second processes.

18 Claims, 3 Drawing Sheets

SYSTEM AND METHOD FOR SELECTING A SYNCHRONOUS OR ASYNCHRONOUS INTERPROCESS COMMUNICATION MECHANISM

CROSS-REFERENCE TO RELATED APPLICATIONS

This application claims benefit of priority under 35 U.S.C. 119(a)-(d) to a Russian Application No. 2013158133 filed on Dec. 27, 2013, which is incorporated by reference herein.

TECHNICAL FIELD

The disclosure relates generally to the field of computer operating systems, and more specifically to systems, methods and computer program products for selecting a synchronous or asynchronous interprocess communication mechanism.

BACKGROUND

In modern computer operating systems, two processes may exchange data using synchronous and asynchronous methods of interprocess communication. Interprocess communication (IPC) generally includes a set of methods of exchanging data among a group of threads in one or more processes. The processes can be launched on one or more computers, linked by a network. IPC methods are divided into methods of message passing, synchronization, shared memory and remote procedure calls. If a process performs an asynchronous operation, the process does not require a response to the operation to continue its execution. If a process performs a synchronous operation, the process requires a response to the operation continue its execution. Operation is an elementary action executed in the context of a particular process (for example, an API function call).

The synchronous and asynchronous mechanisms of interprocess communication are generally used for different purposes and have advantages and drawbacks. Asynchronous operations allow a process to continue working without waiting for a response to the operation, but they may be slower, require more resources of the operating system, and may be complicated to predict. On the other hand, synchronous operations may be faster, require fewer resources of the operating system, and may be easy to predict, but they do not allow the process to continue working until a response to the operation is received.

However, situations arise in the communication between processes where it may become inefficient to execute a certain task through asynchronous calls, for example, when the resources that the process is working with are free at the moment, the required data has been previously stored in cache, and other instances. In such cases, it is more advantageous to perform the required task using synchronous operation, since it will be executed quickly. Likewise, there are situations in which asynchronous operations may be more preferable.

Therefore, there is a need for a mechanism for choosing between the synchronous and asynchronous method of interprocess communication.

SUMMARY

Disclosed are system, method and computer program products for selecting a synchronous or asynchronous method of interprocess communication.

According to an aspect, a method of selecting interprocess communication including; collecting, by a processor, information about resources used by two or more processes involved in an interprocess communication in which a first process can transfer data to a second process using one of a synchronous and asynchronous data transfer methods; analyzing the collected information to determine which data transfer method achieves at least one of minimizing time of the data transfer between processes, maximizing utilization of resources used for the data transfer, minimizing standstill time during the data transfer, minimizing effect of other processes of the operating system on the data transfer; and based on the determination, selecting one of the synchronous or asynchronous method of interprocess communication to transfer the data between the first and second processes.

According to another aspect, a system for selecting interprocess communication including a processor configured to: collect information about resources used by two or more processes involved in an interprocess communication in which a first process can to transfer data to a second process using one of a synchronous and asynchronous data transfer methods; analyze the collected information to determine which data transfer method achieves at least one of minimizing time of the data transfer between processes, maximizing utilization of resources used for the data transfer, minimizing standstill time during the data transfer, minimizing effect of other processes of the operating system on the data transfer; and based on the determination, select one of the synchronous or asynchronous method of interprocess communication to transfer the data between the first and second processes.

According to yet another aspect, a computer program product, stored on a non-transitory computer readable medium, for selecting interprocess communication, including computer executable instructions for: collecting information about resources used by two or more processes involved in an interprocess communication in which a first process attempts to can data to a second process using one of a synchronous and asynchronous data transfer methods; analyzing the collected information to determine which data transfer method achieves at least one of minimizing time of the data transfer between processes, maximizing utilization of resources used for the data transfer, minimizing standstill time during the data transfer, minimizing effect of other processes of the operating system on the data transfer; and based on the determination, selecting one of the synchronous or asynchronous method of interprocess communication to transfer the data between the first and second processes.

The above simplified summary of example aspect(s) serves to provide a basic understanding of the invention. This summary is not an extensive overview of all contemplated aspects of the invention, and is intended to neither identify key or critical elements of all aspects nor delineate the scope of any or all aspects. Its sole purpose is to present one or more aspects in a simplified form as a prelude to the more detailed description of the invention that follows. To the accomplishment of the foregoing, the one or more aspects comprise the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects are described herein in the context system, method and computer program products for selecting a synchronous or asynchronous method of interprocess communication. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
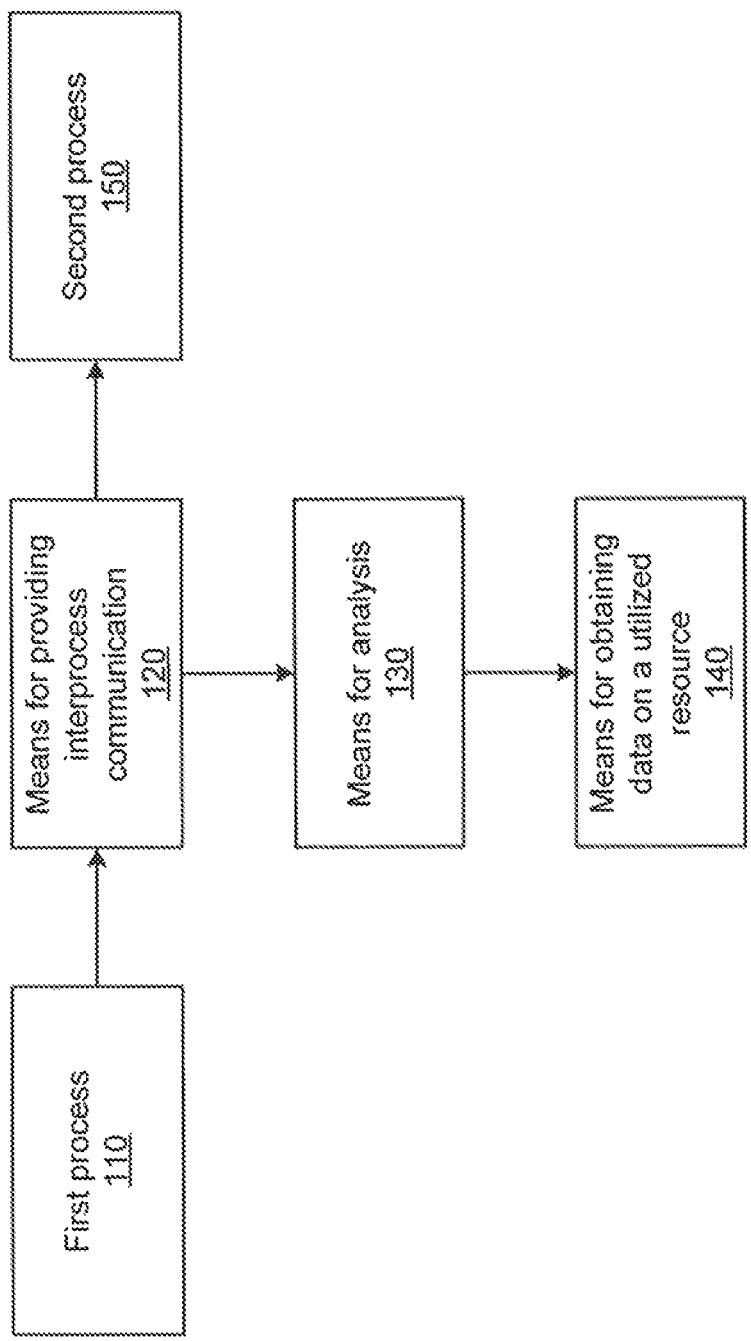
FIG. 1 illustrates a block diagram of an example system for selecting a synchronous or asynchronous interprocess communication.

FIG. 1 illustrates a block diagram of an example system for selecting a synchronous or asynchronous interprocess communication. The system for selecting a synchronous or asynchronous type of interprocess communication method (such as a file, a signal, a socket, a channel, a named channel, a semaphore, a shared memory, a message passing, a memory-mapped file, a message queue, etc.) may include a first process 110, a module for providing an interprocess communication 120, an analysis module 130, a module for obtaining data on a utilized resource 140, and a second process 150. The first process 110 may be configured to perform actions in the operating system for transfer of data to the second process 150 by one of the methods of interprocess communication. The second process 150 may be configured to perform actions in the operating system to receive data from the first process by one of the methods of interprocess communication. The module for providing an interprocess communication 120 may be configured to implement the communication between processes with the help of a selecting of data exchange methods, such as message passing, synchronization, shared memory, or remote procedure calls.

The need to transfer information between processes may be due to the fact that, first of all, the realization of the full working logic in the framework of a single process may be often impossible (in the case when several applications are working with common data on one or even different computers), and secondly, such a monolithic organization of the work is complicated in its realization and attuning, which in turn may lead to errors in execution, and also become a source of vulnerabilities, which can be exploited by malicious programs.

One of the examples of interprocess communication is the transfer of an image from a document scanning program to a graphics processing program. The first process 110 may belong to the scanning program, and may preserve the scanned image in a temporary file, and the second process 150 may belong to the graphics processing program, and may determine the presence of the file in the file system, read it and display the image in the program window.

Another example of a data exchange between processes is the depicting of current stock market information, downloaded from the stock market site to the user's browser. In this case, the first process 110 launched on the stock market server may send data to subscribers as it is updated. The second process 150, running on the user's computer, may constantly wait for the sending of data from the process working on the stock market server, and as soon as such data arrives from the first process 110, such as information on the price quotes of securities, it is instantly displayed in the user's browser. Sockets and channels may be used as the methods of interprocess communication between the above-described processes.

The module for providing an interprocess communication 120 may receive a request from the first process 110 to transfer data to the second process 150. After this, the module for providing interprocess communication 120 may send data characteristic of the request (such as identifiers of the first and second process, the type and volume of data being transferred, identifiers of the resources with which the processes will be working, and so on) to the analysis module 130 for making a decision as to which type of interprocess communication, synchronous or asynchronous, to use for the data transfer from the first process 110 to the second process 150. Then, after the analysis module 130 completes its work, information may be obtained from the latter as to the type of interprocess communication that needs to be used in the data transfer from the first process 110 to the second process 150. After this, in accordance with the result obtained, a transfer of data may be performed to the second process 150 by the means of interprocess communication of the selected type.

The analysis module 130 may be configured to receive a request from the module for providing an interprocess communication 120 to determine the most optimal type of interprocess communication for the current task, to make an analysis to determine a synchronous or asynchronous type in which the data transfer task from the first process 110 to the second process 150 would be performed with the highest efficiency, e.g., minimum time to execute the request, minimum standstill time of resources (such as working memory, processor time, network throughput capacity, files, information media, and so on), and also minimum increase in these characteristics for the other processes of the operating system, and to present the result of the analysis to the module for providing an interprocess communication 120.

The analysis module 130 may receive from the module for providing an interprocess communication 120 a request to perform an analysis to determine the type of interprocess communication with which the first process 110 will transfer data to the second process 150 and make a decision as to which type, synchronous or asynchronous, will be more efficient for the data transfer, where efficiency means minimum time to execute the request, minimum standstill time of resources (such as hard disk, working memory, and so on), and also minimum increase in these characteristics for the other processes of the operating system. After which, the analysis module 130, on the basis of the data obtained in the request from the module for providing an interprocess communication 120 (such as the identifiers of the first 110 and second 150 processes, the type and volume of data being transferred, the identifiers of the resources with which the processes will be working, and so on) may receive data from the module for obtaining data on the utilized resource 140 as to the status of the resources to be used by the processes 110 and 150, which depending on the type of resources include such parameters as presence of information previously placed in cache (to relieve the workload of the resources and speed up the working with them, the results of the most recent or often called operations with the resources, such as the results of an executed SQL request or the content of a requested file, are kept in working memory or on a hard disk, and are put out at once to the client the next time such data is requested from the resource), the status of the access queue to the resource, i.e., is it busy or free and so on. On the basis of an analysis of the data obtained, the analysis module 130 may make a decision as to which type of interprocess communication, synchronous or asynchronous, is preferable. After which, the result of the analysis may be sent to the module for providing an interprocess communication 120 for further working.

The module for obtaining data on the utilized resource 140 may be configured to output, on request and on the basis of the data provided by the analysis module 130, data (such as the identifiers of the first 110 and second 150 processes, the type and volume of data being transferred, the identifiers of the resources with which the processes will be working, and so on) as to the status and properties of the resource (such as size of the queue of processes using the resource, presence of required information previously placed in cache, volume of free working memory, volume of free space on hard disk, and so on) obtained from the resource or from the working memory modules servicing the resource (such as the hard disk driver).

As an example of the working of the system for selecting an interprocess communication, there may exist a situation where one process wishes to read a file from the hard disk. It is not known in advance how much time may be spent on this operation, since the disk might be occupied with calls from other processes, the finding of the file on the disk may also take time, and so on. Therefore, the developer may make use of the asynchronous type of reading data from disk for the execution of his algorithms. When the analysis module 130 receives from the module for providing an interprocess communication 120 the request to determine which of the synchronous or asynchronous types of interprocess communication is preferable to be used, it may request information from the module for obtaining data on the utilized resource 140 (in the present case, the hard disk) as to its load status (size of the queue of processes working with it) and whether the required data is present in cache (i.e., has the required data already been read into and saved in memory at any point). If the required information is already present in memory or the hard disk is free, the analysis module 130 may report to the module for providing an interprocess communication 120 that the operation of reading the file from hard disk may be done synchronously (since it will occur more quickly than when using the asynchronous reading operation), otherwise the operation may be performed asynchronously.

As yet another example of the choice between synchronous and asynchronous interprocess communication, the execution of SQL requests in databases may be considered. The process may send to the database an SQL request to provide data on certain criteria. Since the time for this operation might be rather long, the developer may use an asynchronous type of request. The analysis module 130 may request information from the module for obtaining data on the utilized resource 140 (in this case, the database) as to the caching (i.e., was a similar SQL request executed previously and was data saved for it). If caching has been done, i.e., the data may be obtained quickly, then the SQL request may be executed synchronously.

Figure 2:
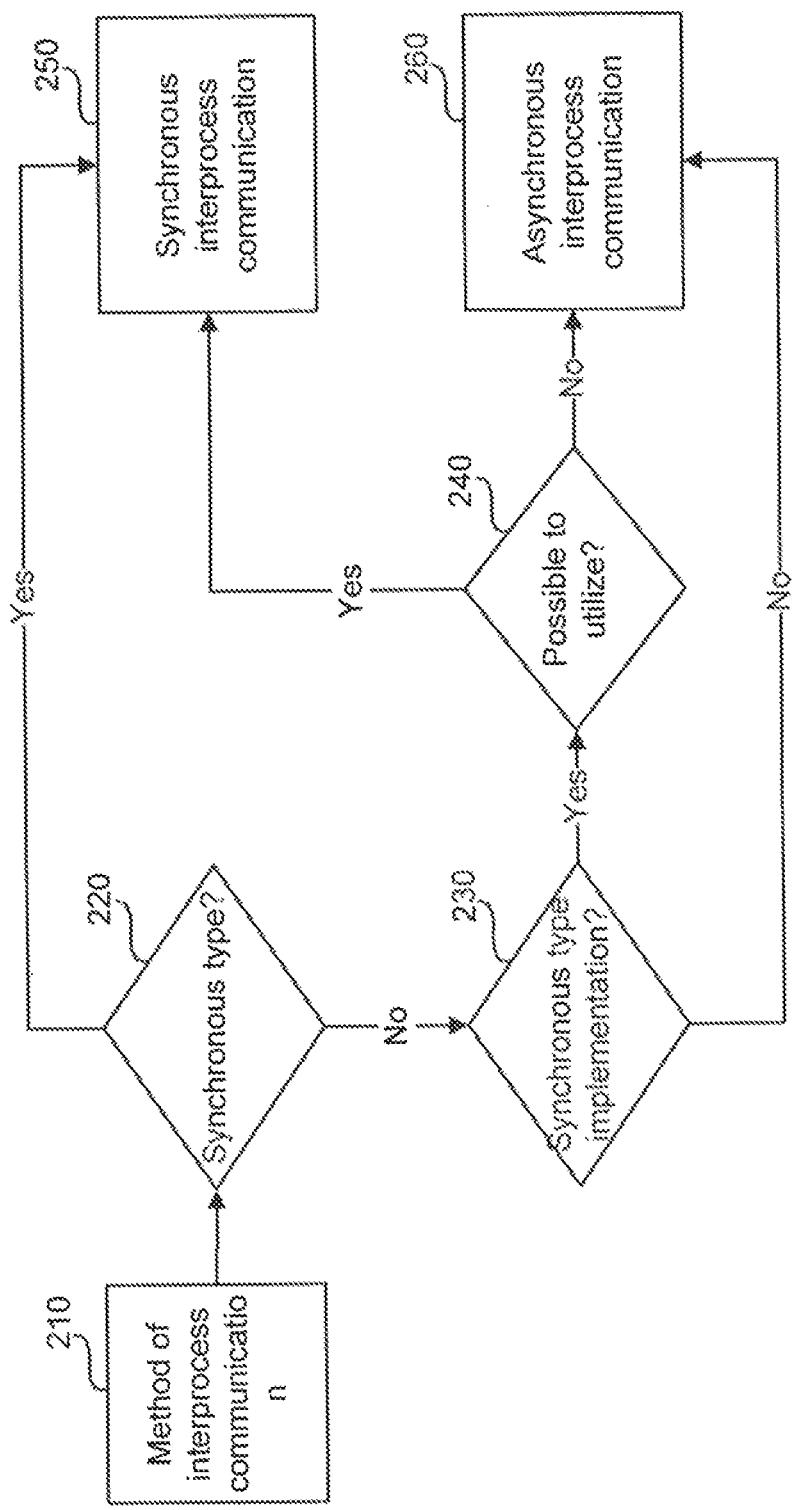
FIG. 2 illustrates a flow diagram of an example method for selecting a synchronous or asynchronous interprocess communication.

FIG. 2 illustrates a flow diagram of an example method for selecting a synchronous or asynchronous interprocess communication. In step 210, a request may arrive at the input of the analysis module 130 from the first process 110 for the transfer of data by one of the methods of interprocess communication. Then, in step 220, a determination may be made as to the method of data transfer—synchronous or asynchronous. If the method of interprocess communication of the request is synchronous, then the second process in step 250 may receive data from the first process by the method of synchronous interprocess communication. If the method of interprocess communication of the request is asynchronous, then in step 230 a determination may be made as to whether there exists an implementation of the given request by the synchronous type of interprocess communication. If no synchronous version exists for the asynchronous request for interprocess communication, then the second process in step 260 may receive data from the first process by the method of asynchronous interprocess communication. If a synchronous version exists for the asynchronous request for interprocess communication, then in step 240 on the basis of the results of the polling of the resource to be utilized a calculation may be made as to the possibility of utilizing the synchronous version of the interprocess communication. If the use of the synchronous version of the request for interprocess communication is found to be advisable, the second process in step 250 may receive data from the first process by the method of synchronous interprocess communication, otherwise the second process in step 260 may receive the data from the first process by the method of asynchronous interprocess communication.

Figure 3:
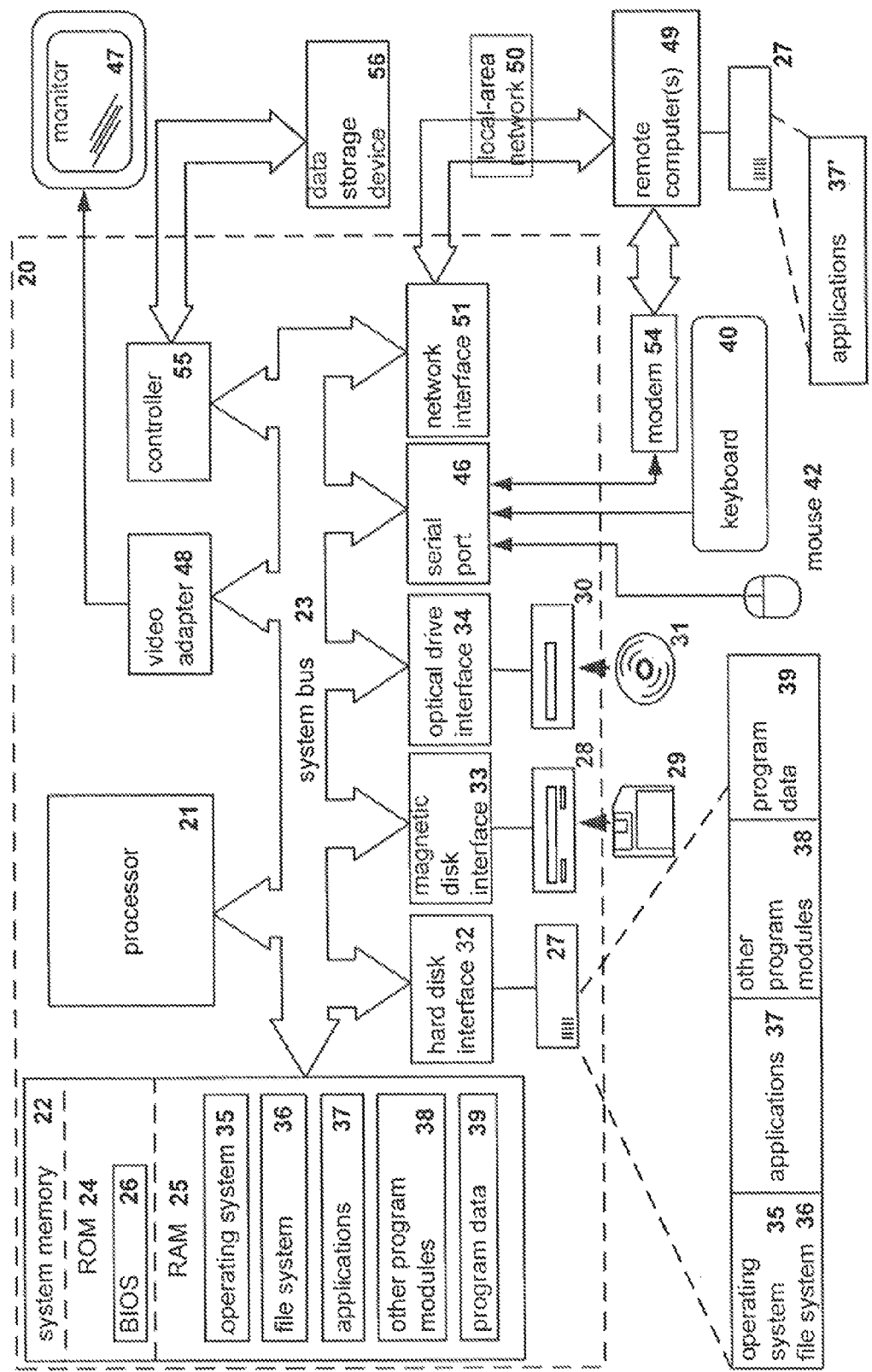
FIG. 3 illustrates a block diagram of an example general-purpose computer system on which the system and method for selecting a synchronous or asynchronous interprocess communication may be implemented.

FIG. 3 depicts one example aspect of a computer system 5 that can be used to implement the disclosed systems and methods for selecting a synchronous or asynchronous interprocess communication. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of selecting interprocess communication, the method comprising:
    receiving a request, by a processor, from a first process to transfer data to a second process using one of a synchronous and asynchronous data transfer methods;
    collecting, by the processor, information about properties of resources used by two or more processes involved in an interprocess communication between the first process and the second process, wherein the properties of a resource include at least one of: workload status of the resource; presence of data previously received from the resource in a cache; and volume of data stored in the resource;
    analyzing, by the processor, the collected information to determine which data transfer method achieves at least one of minimizing time of the data transfer between processes, maximizing utilization of resources used for the data transfer, minimizing standstill time during the data transfer, or minimizing effect of other processes of an operating system on the data transfer; and
    based on the determination, selecting, by the processor, one of the synchronous or asynchronous method of interprocess communication to transfer the data between the first and second processes, comprising: selecting the synchronous method upon detecting that the properties of the resource indicate the presence of data previously received from the resource is in the cache.

2. The method of claim 1, wherein, during the synchronous data transfer method, the first process cannot continue execution after the data transfer until receiving a response from the second process, and, during the asynchronous data transfer method, the first process can continue execution after the data transfer without receiving a response from the second process.

3. The method of claim 1, wherein the transfer of data between processes is performed using at least one of: a file, a signal, a socket, a channel, a named channel, a semaphore, a shared memory, a message passing, a memory-mapped file and a message queue.

4. The method of claim 1, wherein the resource being used by the processes includes at least one of: working memory, processor time, network, files and data storage medium.

5. The method of claim 1, wherein properties of the resource being used by the processes further includes at least one of: a presence of required information stored in the cache, an amount of free working memory, and an amount of free space on a data storage medium.

6. The method of claim 1, wherein the collected information includes at least one of: identifiers of the first and second processes, a type and amount of data being transferred, identifiers of the resources with which the processes will be working, a presence of data in the cache of the resource, and a state of an access queue to the resource.

7. A system for selecting interprocess communication, the system comprising:
a processor configured to:
receive a request from a first process to transfer data to a second process using one of a synchronous and asynchronous data transfer methods;
collect information about properties of resources used by two or more processes involved in an interprocess communication between the first process and the second process, wherein the properties of a resource include at least one of: workload status of the resource; presence of data previously received from the resource in a cache; and volume of data stored in the resource;
analyze the collected information to determine which data transfer method achieves at least one of minimizing time of the data transfer between processes, maximizing utilization of resources used for the data transfer, minimizing standstill time during the data transfer, or minimizing effect of other processes of an operating system on the data transfer; and
based on the determination, select one of the synchronous or asynchronous method of interprocess communication to transfer the data between the first and second processes, comprising: selecting the synchronous method upon detecting that the properties of the resource indicate the presence of data previously received from the resource is in the cache.

8. The system of claim 7, wherein, during the synchronous data transfer method, the first process cannot continue execution after the data transfer until receiving a response from the second process, and, during the asynchronous data transfer method, the first process can continue execution after the data transfer without receiving a response from the second process.

9. The system of claim 7, wherein the transfer of data between processes is performed using at least one of: a file, a signal, a socket, a channel, a named channel, a semaphore, a shared memory, a message passing, a memory-mapped file and a message queue.

10. The system of claim 7, wherein the resource being used by the processes includes at least one of: working memory, processor time, network, files and data storage medium.

11. The system of claim 7, wherein properties of the resource being used by the processes further includes at least one of: a presence of required information stored in the cache, an amount of free working memory, and an amount of free space on a data storage medium.

12. The system of claim 7, wherein the collected information includes at least one of: identifiers of the first and second processes, a type and amount of data being transferred, identifiers of the resources with which the processes will be working, a presence of data in the cache of the resource, and a state of an access queue to the resource.

13. A computer program product, stored on a non-transitory computer readable medium, for selecting interprocess communication, wherein the computer program product includes computer executable instructions for:
receiving a request from a first process to transfer data to a second process using one of a synchronous and asynchronous data transfer methods;
collecting information about properties of resources used by two or more processes involved in an interprocess communication between the first process and the second process, wherein the properties of a resource include at least one of: workload status of the resource; presence of data previously received from the resource in a cache; and volume of data stored in the resource;
analyzing the collected information to determine which data transfer method achieves at least one of minimizing time of the data transfer between processes, maximizing utilization of resources used for the data transfer, minimizing standstill time during the data transfer, or minimizing effect of other processes of an operating system on the data transfer; and
based on the determination, selecting one of the synchronous or asynchronous method of interprocess communication to transfer the data between the first and second processes, comprising: selecting the synchronous method upon detecting that the properties of the resource indicate the presence of data previously received from the resource is in the cache.

14. The product of claim 13, wherein, during the synchronous data transfer method, the first process cannot continue execution after the data transfer until receiving a response from the second process, and, during the asynchronous data transfer method, the first process can continue execution after the data transfer without receiving a response from the second process.

15. The product of claim 13, wherein the transfer of data between processes is performed using at least one of: a file, a signal, a socket, a channel, a named channel, a semaphore, a shared memory, a message passing, a memory-mapped file and a message queue.

16. The product of claim 13, wherein the resource being used by the processes includes at least one of: working memory, processor time, network, files and data storage medium.

17. The product of claim 13, wherein properties of the resource being used by the processes further includes at least one of: a presence of required information stored in the cache, an amount of free working memory, and an amount of free space on a data storage medium.

18. The product of claim 13, wherein the collected information includes at least one of: identifiers of the first and second processes, a type and amount of data being transferred, identifiers of the resources with which the processes will be working, a presence of data in the cache of the resource, and a state of an access queue to the resource.

* * * * *